US011243662B2

(12) United States Patent
Robertson

(10) Patent No.: US 11,243,662 B2
(45) Date of Patent: Feb. 8, 2022

(54) ARRANGING COMPONENTS IN A TWO-DIMENSIONAL AREA

(71) Applicant: International Business Machines Corporation, Armonk, NY (US)

(72) Inventor: Ian Robertson, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/566,290

(22) Filed: Sep. 10, 2019

(65) Prior Publication Data

US 2020/0004393 A1 Jan. 2, 2020

Related U.S. Application Data

(63) Continuation of application No. 14/689,189, filed on Apr. 17, 2015, now abandoned.

(30) Foreign Application Priority Data

May 29, 2014 (GB) ..................................... 1409535

(51) Int. Cl.
*G06F 3/0482* (2013.01)
*G06F 17/11* (2006.01)
(Continued)

(52) U.S. Cl.
CPC ........ *G06F 3/0482* (2013.01); *G06F 3/04842* (2013.01); *G06F 17/11* (2013.01); *G06T 11/60* (2013.01)

(58) Field of Classification Search
None
See application file for complete search history.

(56) References Cited

U.S. PATENT DOCUMENTS

| 5,973,692 | A | * | 10/1999 | Knowlton | ............. | G06F 16/954 |
|           |   |   |         |          |              | 715/835 |
| 7,137,556 | B1 | * | 11/2006 | Bonner | ..................... | B07C 3/14 |
|           |   |   |         |        |                     | 235/462.08 |

(Continued)

OTHER PUBLICATIONS

Application No. 1409535.0, Filed on May 29, 2014, entitled: "Arranging Components in a Two-Dimensional Area", pp. 1-54.

(Continued)

*Primary Examiner* — Cesar B Paula
*Assistant Examiner* — John M Heffington
(74) *Attorney, Agent, or Firm* — Michael A. Petrocelli

(57) ABSTRACT

A method for arranging components in a two-dimensional area includes a component preparation module for providing a set of components for arrangement, determining rectangular covers for each component, and ordering components according to a predefined order preference, and a core layout module for mapping components in order to positions in the arrangement with a first width and in a first direction, including: a row module for positioning components in order in a first full row across the first direction of the first width aligning one of the top or bottom sides of the covers of adjacent components until the next component does not fit in the first width, and a sub-row module for positioning components in any available space within the height of the first full row to form one or more sub-rows in the first direction and extending a distance less than the first width.

16 Claims, 13 Drawing Sheets

(51) Int. Cl.
*G06F 3/0484* (2013.01)
*G06T 11/60* (2006.01)

(56) References Cited

U.S. PATENT DOCUMENTS

| | | | |
|---|---|---|---|
| 7,421,125 B1* | 9/2008 | Rees | G06K 9/34 |
| | | | 382/181 |
| 7,932,907 B2 | 4/2011 | Nachmanson | |
| 8,499,284 B2 | 7/2013 | Pich | |
| 2007/0162903 A1 | 7/2007 | Babb, II | |
| 2007/0198476 A1* | 8/2007 | Farago | G06F 16/9577 |
| 2008/0182635 A1 | 7/2008 | Chiu | |
| 2009/0132942 A1 | 5/2009 | Santoro | |
| 2010/0277480 A1 | 11/2010 | Cao | |
| 2011/0307838 A1 | 12/2011 | Dwyer | |
| 2012/0050337 A1* | 3/2012 | Raffman | G06F 9/451 |
| | | | 345/672 |
| 2012/0162266 A1 | 6/2012 | Douglas | |
| 2012/0280999 A1 | 11/2012 | Nachmanson | |
| 2013/0321458 A1 | 12/2013 | Miserendino | |
| 2015/0346922 A1 | 12/2015 | Robertson | |

OTHER PUBLICATIONS

Dogrusoz et al., "Two-dimensional packing algorithms for layout of disconnected graphs", Information Sciences, An International Journal, Information Sciences vol. 143 (2002) 147-158.

Freivalds et al., "Disconnected Graph Layout and the Polyomino Packing Approach", Proceedings GD 2001, Springer LNCS 2265, pp. 378-391.

Gansner et al., "Visualizing Streaming Text Data with Dynamic Graphs and Maps", Graph Drawing Lecture Notes in Computer Science vol. 7704, 2013, pp. 439-450, 2013.

Hu, "Algorithms for Visualizing Large Networks", AT&T Labs—Research, http://www2.research.att.com/~yifanhu/PUB/ch16.pdf, Sep. 16, 2011, pp. 1-25.

Hua et al., "Improving the Quality of Clustered Graph Drawing Though a 'Dummy Element' Approach", 2013 10th International Conference Computer Graphics, Imaging and Visualization, pp. 88-92.

Huang et al., "Improving Force-Directed Graph Drawings by Making Compromises between Aesthetics", 2010 IEEE Symposium on Visual Languages and Human-Centric Computing, pp. 176-183.

Knuth et al., "Breaking Paragraphs into Lines*", Software-Practice and Experience, vol. 11, (1981) pp. 1119-1184.

List of IBM Patents and Patent Applications Treated as Related. Filed Herewith. 2 pages.

Štajdohar et al., "FragViz: visualization of fragmented networks", BMC Bioinformatics, Impact Factor 2.67, Electronic Publication Date: Sep. 22, 2010, http://www.biomedcentral.com/1471-2105/11/475, pp. 1-9.

Taniguchi et al., "PanoramaExcerpts: Extracting and Packing Panoramas for Video Browsing", ACM Multimedia 97—Electronic Proceedings, Nov. 8-14, 1997, Crowne Plaza Hotel, Seattle, USA, pp. 1-19.

United Kingdom Search Report, Application No. GB1409535.0, Reference No. GB920140013GB1, pp. 1-3.

* cited by examiner

ARRANGING COMPONENTS IN A TWO-DIMENSIONAL AREA

BACKGROUND

This invention relates to the field of arranging components in a two-dimensional area. In particular, the invention relates to arranging components in a two-dimensional area in which the components are of varying size.

Graphs are frequently used to model systems of entities (vertices) and the relationships between them (edges). Graph layout algorithms may address the problem of producing aesthetically pleasing drawings of such graphs. Most graph drawing algorithms assume that the graph to be drawn consists of a single connected component. In practice, real graphs are often disconnected, and consists of several distinct connected components. The number of such components may be very large (thousands or more), and each component may be of any size—anything from a single vertex to a giant component consisting of thousands or even millions of vertices.

SUMMARY

According to a first aspect of the present invention there is provided a system for arranging components in a two-dimensional area, comprising: a component preparation module for providing a set of components for arrangement, determining rectangular covers for each component, and ordering components according to a predefined order preference; a core layout module for mapping components in order to positions in the arrangement with a first width and in a first direction, including: a row module for positioning components in order in a first full row across the first direction of the first width aligning one of the top or bottom sides of the covers of adjacent components until the next component does not fit in the first width; a sub-row module for, before starting a next row, positioning components in any available space within the height of the first full row to form one or more sub-rows in the first direction and extending a distance less than the first width; wherein if the top sides of the covers are aligned any sub-rows and full rows are below a previous row, if the bottom sides of the covers are aligned any sub-rows and full rows are above a previous row.

The core layout module may include: a first justifying module for justifying components horizontally within a full row and within a sub-row; and, optionally, a second justifying module for justifying components vertically within a sub-row.

The system may include: an optimization module for, once all the components are positioned, optimizing an arrangement quality by altering the height and width of the area.

The optimization module may include: a measure of arrangement quality determining module for determining the measure of arrangement quality for the first width and the resultant height; a width replacement module for replacing the first width with a new width and repeating the method of mapping the components; an iteration module for repeating the replacing of the width with a new width until an optimization of the arrangement quality is obtained.

The arrangement quality may be one of the group of: an aspect ratio of the area; a packing efficiency of the area; a size of the area; any user-defined measure of arrangement quality.

The component preparation module may include a predefined order preference in the form of one of the group of: decreasing order of vertex count; decreasing order of component height; decreasing order of the greater of component height or component width; decreasing order of any user-defined component measure; alphabetically by vertex label; by vertex type and label.

The sub-row module may include positioning components in any available space for one or more sub-rows including: positioning components in a sub-row; positioning components in a subsequent sub-row in any available space within a height of a previous sub-row.

The core layout module may include: a rotating module for rotating components so that they align with the axes of the arrangement.

The core layout module may further include: a super-component module for: applying the method for non-singleton components to display the non-singleton components in a rectangular region to create a super-component; and applying the method to the super-component and the excluded singleton components to create a final arrangement.

The sub-row module may include: determining candidate insertion points within a row or sub-row; smoothing the insertion list; placing a next component in a sub-row at a first insertion point in which the component's height fits in the first direction.

The sub-row module may further include a subsequent sub-row module including: updating the insertion list; placing a next component in a sub-row at a first insertion point in which the component's height fits in the first direction.

According to a second aspect of the present invention there is provided a system for arranging components in a two-dimensional area, comprising: a component preparation module for providing a set of components for arrangement, determining rectangular covers for each component, and ordering components according to a predefined order preference; a core layout module for mapping components in order to positions in the arrangement with a first height and in a first direction, including: a column module for positioning components in order in a first full column along the first direction of the first height aligning one of the left or right sides of the covers of adjacent components until the next component does not fit in the first height; a sub-column module for, before starting a next column, positioning components in any available space within the width of the first full column to form one or more sub-columns in the first direction and extending a distance less than the first height; wherein if the left sides of the covers are aligned any sub-columns and full columns are to the right of a previous column, if the right sides of the covers are aligned any sub-columns and full columns are to the left of a previous column.

The core layout module may include: a first justifying module for justifying components vertically within a full column and within a sub-column; and, optionally, a second justifying module for justifying components horizontally within a sub-column.

The system may include: an optimization module for, once all the components are positioned, optimizing an arrangement quality by altering the height and width of the area.

The optimization module may include: a measure of arrangement quality determining module for determining the measure of arrangement quality for the first height and the resultant width; a height replacement module for replacing the first height with a new height and repeating the method of mapping the components; an iteration module for repeating the replacing of the height with a new height until an optimization of the arrangement quality is obtained.

The arrangement quality may be one of the group of: an aspect ratio of the area; a packing efficiency of the area; a size of the area; any user-defined measure of arrangement quality.

The component preparation module may include a predefined order preference in the form of one of the group of: decreasing order of vertex count; decreasing order of component width; decreasing order of the greater of component height or component width; decreasing order of any user-defined component measure; alphabetically by vertex label; by vertex type and label.

The sub-column module may include positioning components in any available space for one or more sub-columns including: positioning components in a sub-column; positioning components in a subsequent sub-column in any available space within a width of a previous sub-column.

The core layout module may include: a rotating module for rotating components so that they align with the axes of the arrangement.

The core layout module may further include: a super-component module for: applying the method for non-singleton components to display the non-singleton components in a rectangular region to create a super-component; and applying the method to the super-component and the excluded singleton components to create a final arrangement.

The sub-column module may include: determining candidate insertion points within a row or sub-column; smoothing the insertion list; placing a next component in a sub-column at a first insertion point in which the component's width fits in the first direction.

The sub-column module may further include a subsequent sub-column module including: updating the insertion list; placing a next component in a sub-column at a first insertion point in which the component's width fits in the first direction.

According to a third aspect of the present invention there is provided a method for arranging components in a two-dimensional area, comprising: providing a set of components for arrangement; determining rectangular covers for each component; ordering components according to a predefined order preference; mapping components in order to positions in the arrangement including: defining a first width of the area and a first direction across the width; positioning components in order in a first full row across the first direction of the first width aligning one of the top or bottom sides of the covers of adjacent components until the next component does not fit in the first width; before starting a next row, positioning components in any available space within the height of the first full row to form one or more sub-rows in the first direction and extending a distance less than the first width; repeating the steps of positioning components in a next full row and one or more sub-rows, until all components are positioned; wherein if the top sides of the covers are aligned any sub-rows and full rows are below a previous row, if the bottom sides of the covers are aligned any sub-rows and full rows are above a previous row.

The first direction may be left to right or right to left. The method may also include justifying components horizontally within a full row and within a sub-row and, optionally, justifying components vertically within a sub-row.

The method may include the further steps of: once all the components are positioned, determining a measure of arrangement quality, and determining an optimization of the arrangement quality; replacing the first width with a new width and repeating the method of mapping the components; determining the new measure of arrangement quality of the display; and repeating the replacing of the width with a new width until an optimization of the arrangement quality is obtained.

The arrangement quality may be one of the group of: an aspect ratio of the area; a packing efficiency of the area; a size of the area; any user-defined measure of arrangement quality.

The predefined order preference may be one of the group of: decreasing order of vertex count; decreasing order of component height; decreasing order of the greater of component height or component width; decreasing order of any user-defined component measure; alphabetically by vertex label; by vertex type and label.

Positioning components in any available space for one or more sub-rows may include: positioning components in a sub-row; and positioning components in a subsequent sub-row in any available space within a height of a previous sub-row. The method may also include rotating components so that they align with the axes of the arrangement.

The method may further include: applying the method for non-singleton components to display the non-singleton components in a rectangular region to create a super-component; and applying the method to the super-component and the excluded singleton components to create a final arrangement.

Positioning components in any available space within the height of the first full row to form one or more sub-rows in the first direction and extending a distance less than the first width may include: determining candidate insertion points within a row or sub-row; smoothing the insertion list; placing a next component in a sub-row at a first insertion point in which the component's height fits in the first direction.

Positioning components in a subsequent sub-row may include: updating the insertion list; and placing a next component in a sub-row at a first insertion point in which the component's height fits in the first direction.

According to a fourth aspect of the present invention there is provided a method for arranging components in a two-dimensional area, comprising: providing a set of components for arrangement; determining rectangular covers for each component; ordering components according to a predefined order preference; mapping components in order to positions in the arrangement including: defining a first height of the area and a first direction along the height; positioning components in order in a first full column along the first direction of the first height aligning one of the left or right sides of the covers of adjacent components until the next component does not fit in the first height; before starting a next column, positioning components in any available space within the width of the first full column to form one or more sub-columns in the first direction and extending a distance less than the first height; repeating the steps of positioning components in a next full column and one or more sub-columns, until all components are positioned; wherein if the left sides of the covers are aligned any sub-columns and full columns are to the right of a previous column, if the right sides of the covers are aligned any sub-columns and full columns are to the left of a previous column.

The first direction may be top to bottom or bottom to top. The method may also include justifying components vertically within a full column and within a sub-column and, optionally, justifying components horizontally within a sub-column.

The method may include the further steps of: once all the components are positioned, determining a measure of arrangement quality, and determining an optimization of the arrangement quality; replacing the first height with a new height and repeating the method of mapping the components; determining the new measure of arrangement quality of the display; and repeating the replacing of the height with a new height until an optimization of the arrangement quality is obtained.

The arrangement quality may be one of the group of: an aspect ratio of the area; a packing efficiency of the area; a size of the area; any user-defined measure of arrangement quality.

The predefined order preference may be one of the group of: decreasing order of vertex count; decreasing order of component width; decreasing order of the greater of component height or component width; decreasing order of any user-defined component measure; alphabetically by vertex label; by vertex type and label.

Positioning components in any available space for one or more sub-columns may include: positioning components in a sub-column; and positioning components in a subsequent sub-column in any available space within a width of a previous sub-column. The method may also include rotating components so that they align with the axes of the arrangement.

The method may further include: applying the method for non-singleton components to display the non-singleton components in a rectangular region to create a super-component; and applying the method to the super-component and the excluded singleton components to create a final arrangement.

Positioning components in any available space within the width of the first full column to form one or more sub-columns in the first direction and extending a distance less than the first height may include: determining candidate insertion points within a column or sub-column; smoothing the insertion list; placing a next component in a sub-column at a first insertion point in which the component's width fits in the first direction.

Positioning components in a subsequent sub-row may include: updating the insertion list; and placing a next component in a sub-column at a first insertion point in which the component's width fits in the first direction.

According to a fifth aspect of the present invention there is provided a computer program product for arranging components in a two-dimensional area, the computer program product comprising a computer-readable storage medium having computer-readable program code embodied therewith, the computer-readable program code configured to carry out the method of the third aspect of the present invention.

According to a sixth aspect of the present invention there is provided a computer program product for arranging components in a two-dimensional area, the computer program product comprising a computer-readable storage medium having computer-readable program code embodied therewith, the computer-readable program code configured to carry out the method of the fourth aspect of the present invention.

According to a seventh aspect of the present invention there is provided a computer program stored on a computer readable medium and loadable into the internal memory of a digital computer, comprising software code portions, when said program is run on a computer, for performing the method steps of any of the features listed above.

According to an eighth aspect of the present invention there is provided a method substantially as described with reference to the figures.

According to a ninth aspect of the present invention there is provided a system substantially as described with reference to the figures.

The described aspects of the invention provide the advantage of providing a layout of components that runs quickly, respects a user-defined ordering, and minimizes the amount of wasted space.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Existing approaches to component arrangement problems may fall into two general categories—rectangle packing and polyomino packing. The component arrangement problem also shares some characteristics with the text processing task of breaking paragraphs into lines of words for display in a fixed region of a page.

With the rectangle packing approach, each component drawing is enclosed within a bounding rectangle, and these rectangles are then packed into a larger rectangular area with a rectangle packing algorithm. Typically, this would be some variation of a shelf/strip/bin-packing algorithm, which would aim to pack the rectangles into a fixed-width strip.

Figure 1A:
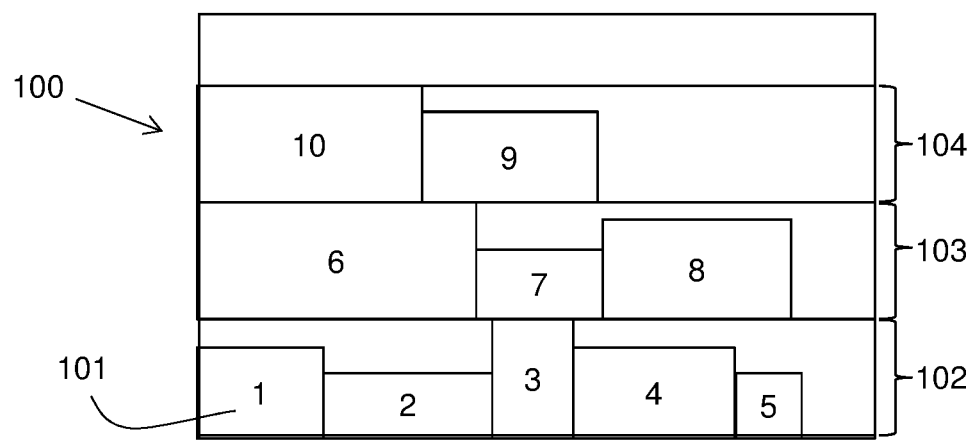
FIGS. 1A to 1C are schematic diagrams showing the outcomes of rectangular packing algorithms as known in the prior art.
Figure 1B:
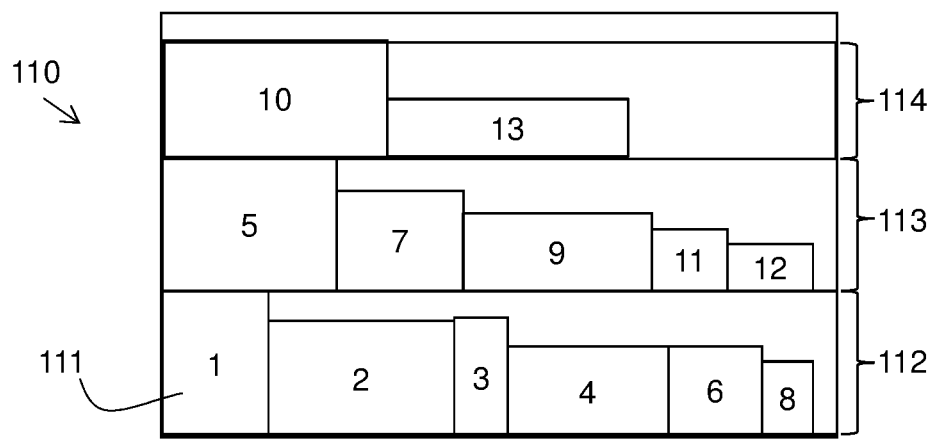

FIG. 1A shows a rectangular packing 100 with fixed width strip packing algorithm in which blocks 101 are packed into fixed width strips 102, 103, 104 in order. FIG. 1B shows a rectangular packing 110 with fixed width strip packing with strip re-use. Blocks 111 are packed in fixed width strips 112, 113, 114 but extra space at the ends of strips is re-used when a smaller block becomes available. Therefore, the blocks 111 are out of order.

Figure 1C:
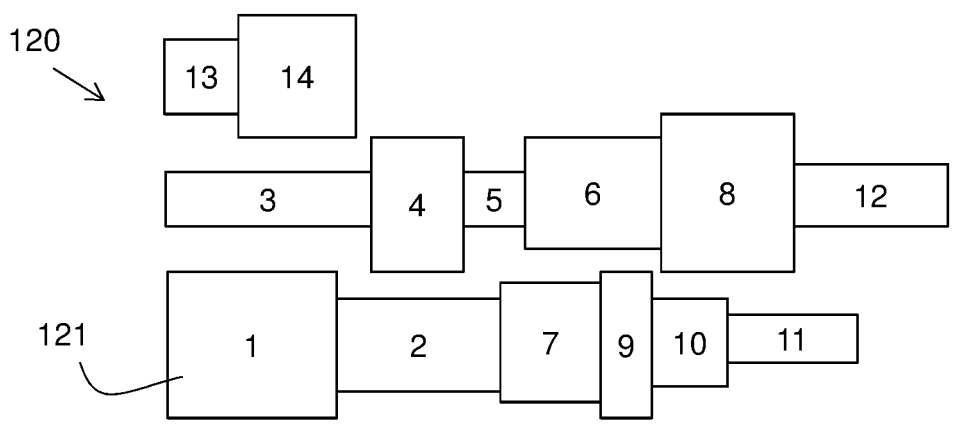

Strip packing algorithms have been adapted to perform packing into a region which approximates a specified aspect ratio as shown in FIG. 1C. In FIG. 1C, a rectangular packing 120 is shown with variable width row tiling of blocks 121. This is convenient for displaying the final result in a rectangular region on a computer screen or sheet of paper.

Similar methods are used in computer graphics for packing large numbers of small images (jpeg files) into an enclosing super-image, or sprite, which is more efficient to load in a web-page.

However, all rectangle packers may typically generate configurations that reflect the mechanics of their internal workings, and no attempt is made to place items in an aesthetic manner. The component numberings in FIGS. 1A, 1B, and 1C illustrate this defect. As a result, it can be difficult to locate items in the final drawing, since smaller rectangles in particular may have been hidden away in small interstitial gaps between the larger elements. If the input rectangles were presented in a specific meaningful order, this order will bear no relation to the positional mapping in the final drawing.

The polyomino packing approach dispenses with the enclosing rectangles, and covers each component with a set of square tiles, forming what is known to mathematicians as a polyomino. The tiles may be chosen to be smaller than the enclosing rectangle of any component, so the polyomino boundary gives a much better approximation to the shape of each underlying component drawing. A polyomino packer then attempts to arrange the polyominos in a non-intersecting configuration, using a greedy grid placement method very similar to the children's game of battleships.

The methods described above may suffer from a number of drawbacks, including for example:
  (a) There is no easy way of pre-selecting a suitable width for the region for use in the packing algorithm, so that layouts can appear either too tall and narrow, or too wide and shallow.
  (b) There is no automatic control over the amount of additional space wasted when a packed layout is scaled into a user specified rectangular display region.
  (c) The packing algorithms generally require the components to be processed in order of decreasing height, whereas a user will generally have in mind a predetermined order in which the components should be processed and arranged in the final layout.
  (d) There is no simple relationship between the order in which components are processed and their positions within the final layout. The polyomino algorithm is particularly capricious in this respect, but the strip packing and row tiling algorithms all have their own idiosyncrasies. Component positioning is driven exclusively by the desire to construct an efficient packing, even if this comes at the expense of clarity and visual aesthetics.
  (e) Component layout quality can often be improved by rotating individual components so that they align cleanly with the coordinate axes.
  (f) Layout speed is of primary importance, since component layouts are often required in highly interactive environments. Performance of the polyomino algorithm, in particular, is critically dependent on the choice of the tile size.

Therefore, to address the aforementioned problems, a method and system are described for ordering components in a two-dimensional rectangular area. A collection of components might be generated by any of the many stock algorithms described in the literature, and the described method may solve the problem of arranging these components into a rectangular configuration that may be understandable and aesthetically pleasing, and which may make efficient use of the overall area into which the final layout must fit. The components may not be modified in this process, only translated (or possibly rotated) into a final position in the completed arrangement.

The described method and system may be applied in various implementations and applications in which components which represent items or concepts and which can be covered or enclosed by two-dimensional rectangles are arranged in a two-dimensional area. The implementations and applications may include as examples: the display of components in which the area is a display or drawing area; the rectangular packing of components; modeling of problems using rectangular packing of components; etc.

The proposed component layout algorithm attempts to produce a layout which may run quickly, be visually pleasing, respect a user-defined ordering of the components presented to it as input, and which may minimize the amount of wasted space when the final layout is scaled into a rectangular area. The rectangular area may be optimized according to various specified criteria, for example, with a specified aspect ratio, with efficiency of packing, with a minimum area, etc.

In the display context of the component arrangement, components to be arranged may be defined as connected components of a network or graph. Each component may include a collection of entities (vertices) mutually interconnected by links (edges). A singleton component may include just one vertex, with no edges. Singleton components are special in that they can inherit properties from their single member in a way which would not be meaningful in a multi-vertex component. For example, an entity might have a representational type ("Male", "Female", etc.) and a label ("Bill", "Georgina", etc.). Hence when discussing potential orderings of graph components, special rules are available for the singleton components: ordering by type, by label, by label within type, etc. Graph components may be commonly ordered by some measure of importance or "size", where size can mean physical drawing size (width, height, area, etc.), or some graph-based measure, such as number of vertices (vertex count), number of edges (edge count), etc.

Components are assumed to be ordered in a way which is meaningful to the user. There is no requirement to process components in an order that is convenient for the algorithm.

A feature of the proposed algorithm includes a strict mapping of the user supplied component order into a row-wise or column-wise placement in the rectangular layout area. By maintaining this correspondence, the user may always know roughly where to look in order to find a component of interest. This is in contrast to the behavior of the packing algorithms described above, which may sacrifice component order and the user's mental map in order to enhance the efficiency of the packing.

The proposed algorithm may be, in essence, a rectangle packing algorithm, and could be applied in any rectangle packing context, not simply those where packing order or aesthetic criteria are just as important as the packing efficiency.

An example of an application of rectangular packing may be sprite generation. Sprites may be used to speed up image loading when loading a web page. Instead of loading all images on the web page one by one, the images may be combined into a single larger image—called a sprite—which is then loaded in a single operation. Sprite generation may be modelled as a rectangle packing problem, where each image is represented as a rectangle, and the sprite is just a single enclosing rectangle into which the constituent images are packed without overlap. It is desirable to pack the images in the sprite in a way which may minimise the overall sprite size, since smaller sprites require less download time and consume less network bandwidth. Hence finding an optimal sprite amounts to finding a minimum area enclosing rectangle.

Another example of an application of rectangular packing may include task scheduling. Task scheduling may be modelled as a rectangle packing problem. Each job is represented by a rectangle, where the height is the number of workers needed, and the width is the amount of time required. The total number of workers is the height of an enclosing rectangle, and the length of time is the width. All the job rectangles must be packed into the enclosing rectangle without overlap. Minimising the total labour cost amounts to finding a minimum area enclosing rectangle.

Figure 2:
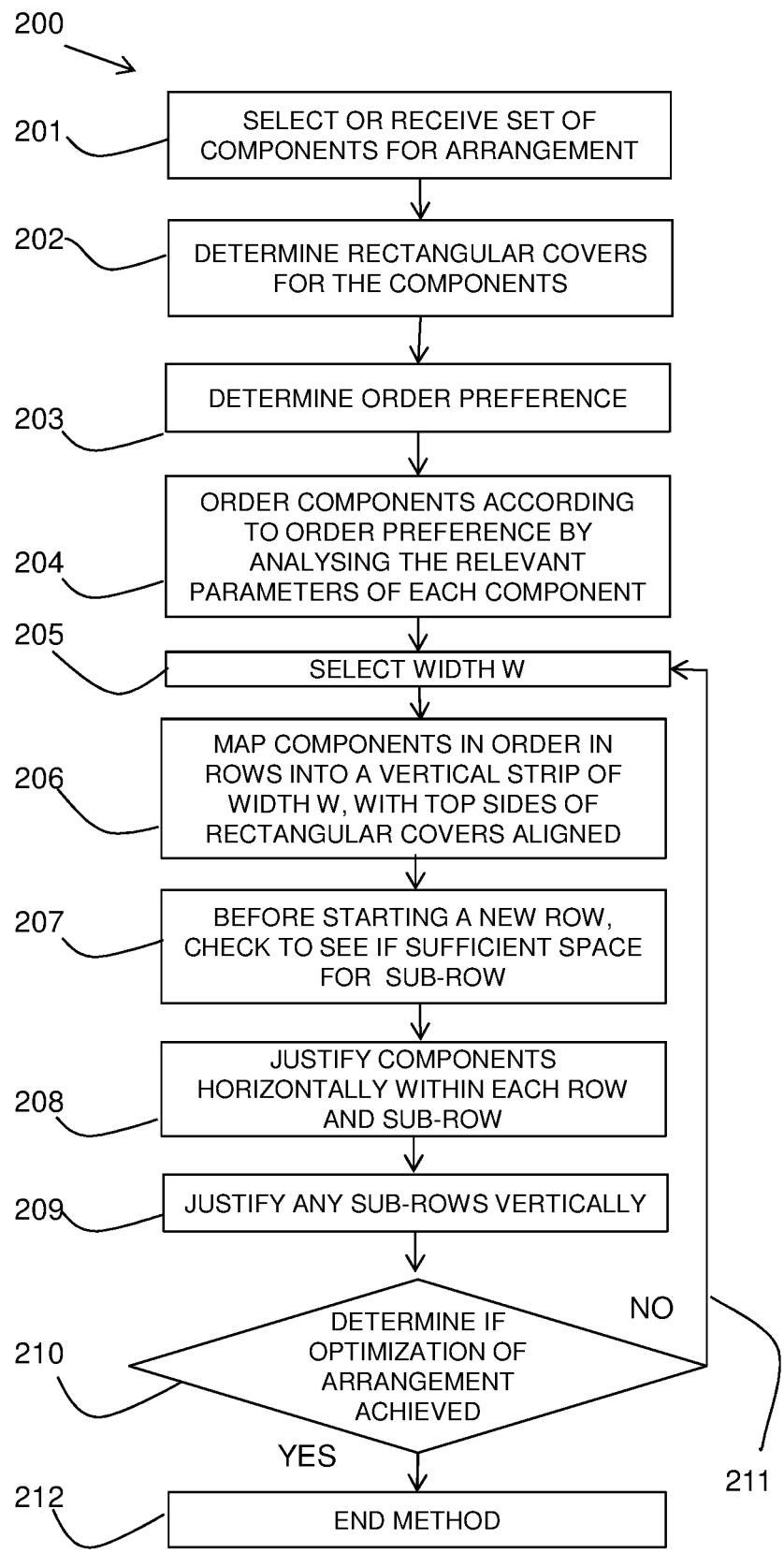
FIG. 2 is a flow diagram of an example embodiment of a method in accordance with the present invention.

Referring to FIG. 2, a flow diagram 200 shows an example embodiment of the described method.

A set of components may be selected or received 201 for arrangement. The set of components may be any form of two-dimensional representation of elements or combined elements for arrangement in a two-dimensional rectangular area. The components may be disconnected graph components, for example, provided by entering a graph under consideration from a database. In another example, the components may be rectangular representations of amounts or entities.

Rectangular covers may be determined 202 for the components if the components are not already provided in rectangular form. A rectangular cover may be an object that represents the component within a set of rectangular borders, usually using a minimum area of rectangle to cover the component.

An order preference for the components may be determined 203, for example, as received from a user input, or preset for a given arrangement.

The order preference may be, for example in the context of a display of graph components, one of the orders listed below:

Decreasing order of vertex count.
Decreasing order of component height.
Decreasing order of Max (component height, component width).
Decreasing order of any user-defined measure of component interest or importance.
Alphabetically by vertex label—singleton components only.
Ordering by vertex type and label—singleton components only.

The relevant parameters for each of the components may be analyzed to order 204 the components according to the order preference.

In a first described embodiment, a width w may be selected 205, for example, in the form of the width of the widest component, or the sum of all component's widths.

The components may be mapped 206 in rows into an infinite vertical strip of a specified width w, according to the order preference placing the components in a first direction, left-to-right or right-to-left. In the described embodiment, the rows are filled from top to bottom and the top sides of the bounding rectangular covers of the components aligned. This is the arrangement described in detail. However, in an alternative embodiment, the rows may be filled from bottom to top and the bottom sides of the bounding rectangular covers of the component are aligned. Components are added to each row until the end of a row within the width w is reached due to the next component being too wide to fit into the row within width w.

The first stage of the method arranges the components into an infinite vertical strip with a specified width. Constraining the layout to a fixed width may simplify the packing problem, and the component placement can be carried out rapidly.

Before starting a new row beneath the current row, a check is made 207 to see if there is sufficient space at the lower right hand end of the current row to accommodate further components in one or more "sub-rows", without increasing the height or width of the row.

This step can reclaim significant amounts of otherwise wasted space in situations where there is considerable variation in component heights along a row. Sub-row placement still respects the guiding direction of the positioning, i.e. left-to-right and top-to-bottom placement strategy, in contrast to the space reclamation techniques employed in other strip packing algorithms.

In alternative embodiments, the placement strategy may be from right-to-left, and/or may be with rows built from the bottom upwards with bottom sides of the bounding rectangle covers of the components aligned, and with any sub-rows placed above a current row.

Alternatively, the roles of the width and height may be transposed in which the resulting method would arrange components in columns with corresponding sub-column placements. In such an embodiment, the described features of sub-rows may be interpreted to be sub-columns and the left-to-right or right-to-left placement of components in rows and sub-rows may be interpreted as top-to-bottom or bottom-to-top placement of components in columns or sub-columns.

Once a row or sub-row is completed, the components may be horizontally justified 208 to create a uniform spacing along the row and an exact alignment on the left and right row borders. Any sub-rows may be vertically justified 209 within the main row.

Once all the components have been placed, it may then be determined 210 if the desired optimization of the arrangement has been achieved, for example, a desired aspect ratio which may be set by a user or pre-defined for a given display. If it has not been achieved, the method may loop 211 to select a new width at step 205. If the optimization has been achieved, the method may end 212.

In the example of optimizing the aspect ratio this may be carried out by calculating the height of the total layout with the first width w and the aspect ratio. The method may be repeated with different widths until a target aspect ratio is matched to a suitable accuracy, or some other drawing quality measure is optimized. Other optimizations of the arrangement are discussed further below, but in each case, iterations may be carried out of varying the width w and resultant height of the arrangement to reach the required optimization.

As the core placement method is straightforward, the process runs rapidly, and requires only a small number of trial widths to achieve convergence.

The result of the above method is a component layout of:

Left-to-right, top-to-bottom placement in the order defined by the user. This preserves the user's mental map of where components can be found.

The use of sub-row placement, when possible, to enhance packing efficiency.

Horizontal justification along rows and sub-rows.

Vertical justification of sub-rows within rows.

Rapid packing to a fixed width to reduce algorithm complexity and enhance performance.

Rapid iterative adjustment of the layout width to optimize a packing or quality measure.

Some simple adjustments may be made to improve behavior in common situations.

Automatic rotation of components may be carried out so that they align cleanly with the coordinate axes. This may improve the packing efficiency without changing the component layout itself (beyond rotation). The rotation may be calculated by determining an approximate minimum area bounding box enclosing the component. This is illustrated further with respect to FIG. 11.

Special treatment may be given to singleton components (components with just a single vertex). This may be particularly valuable, since there are often large numbers of singletons in any large network. In one approach, the proposed algorithm may be used to pack the non-singleton components into a rectangular region with a desired aspect ratio. This region is then treated as a single "super-component", and the algorithm is run for a second time with the singleton components and the super-component as input. The final result may be a component layout with the required aspect ratio, with the non-singleton components in the top left corner, and the singleton components arranged in a border down the right side and across the bottom edge of the layout. Alternatively, the proposed algorithm may be used to pack groups of singleton components into "super-components" which may then be packed with the non-singleton components in a second pass through the algorithm. Many variations on these approaches may be possible.

Nesting of sub-rows within sub-rows may also be used to increase the packing efficiency of the component layout, while still respecting the overall left-to-right and top-to-bottom character of the packing strategy.

Aspect Ratio, Efficiency, Adjusted Efficiency and Aspect Ratio Efficiency

In the context of a display of components, the following measures of arrangement quality may be used. The individual components comprising a component layout each have their own bounding rectangles. In other contexts and applications, other measures of arrangement quality may be defined and later optimized.

Let A denote the total area of these individual bounding rectangles. The efficiency (e) of a component layout with a bounding rectangle of width w and height h is defined as $e=A/(w*h)$. The efficiency is the proportion of the component layout area that is occupied by the bounding rectangles of its constituent components. Generally speaking, layouts with high efficiency are to be preferred, since less space may be wasted on the drawing area.

The aspect ratio (R) of the component layout is defined as $R=w/h$. If a component layout with aspect ratio R is scaled into a drawing region with an aspect ratio D which differs substantially from R, the efficiency of the rescaled drawing will be reduced. For example, a square drawing will have broad empty side borders when it is scaled into a landscape region, as shown in FIG. 3.

Figure 3:
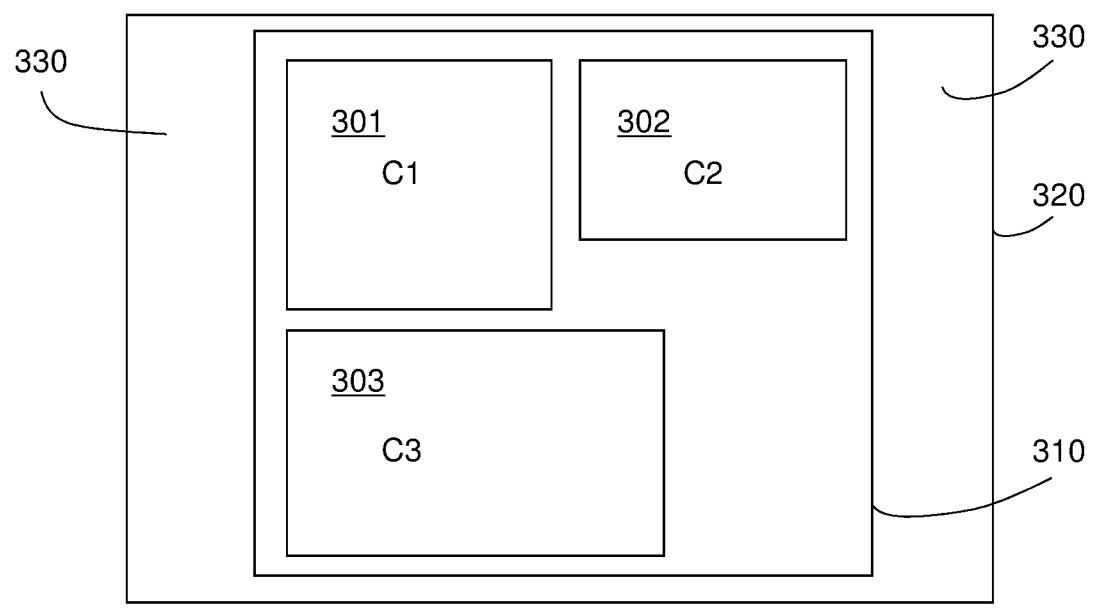
FIG. 3 is a schematic diagram illustrating a problem of the prior art.

In FIG. 3, three components C1, C2, C3 301-303 are drawn in an approximate square 310 and then scaled to a landscape display region 320. The border 330 is wasted space and reduces the adjusted efficiency.

The adjusted efficiency (e') of a component layout may correct for this scaling effect, and may be given by the formula:

$$e' = \begin{cases} (R/D)e & \text{if } D > R \\ (D/R)e & \text{if } D \leq R \end{cases}$$

Clearly $e' \leq e$ in all cases. In situations where matching a desired aspect ratio is more important than the overall packing efficiency, it is convenient to work with the aspect ratio efficiency (q), which may be defined as:

$$q = \begin{cases} (R/D) & \text{if } D > R \\ (D/R) & \text{if } D \leq R \end{cases}$$

Component Layout Algorithm

The proposed component layout algorithm comprises two principal modules:

Module-1: A core layout module which may arrange components in a vertical strip of pre-determined width.

Module-2: An optimization module which may adjust the width used in module-1 so as to optimize some measure of layout quality—the adjusted efficiency or aspect ratio efficiency, for example.

Module-1: Core Layout Module

This module may arrange the components in rows into an infinite vertical strip (or horizontal strip if columns are used in place of rows) with a specified width as described with reference to FIG. 2. In a row embodiment, components may be placed left-to-right in a single row, with the top sides of the bounding rectangles aligned, until the end of the row is reached. Before starting a new row beneath the current one, a check is made to see if there is sufficient space at the lower right hand end of the current row to accommodate further components in a sub-row placement step, without further increasing the height (or width) of the row. As each row or sub-row placement is completed, the components may be justified horizontally to create a uniform spacing along the row, and an exact alignment on the left and right row borders. Any sub-rows placed within the main row may also be justified vertically within the row. This phase of the component layout is illustrated in FIG. 4.

Figure 4:
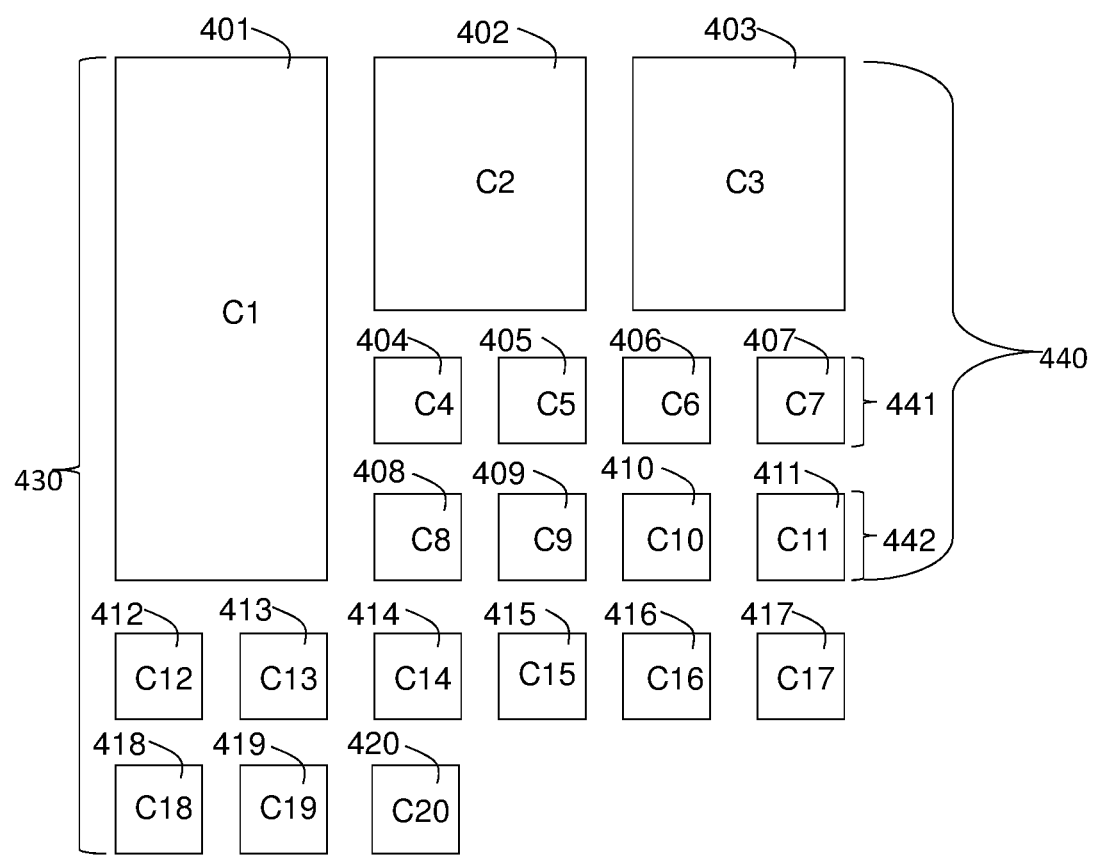
FIG. 4 is a schematic diagram of an example display in accordance with the present invention.

In the layout of FIG. 4, twenty components C1-C20 (401-420) are placed into an approximate square configuration 430. The components C1-C20 (401-420) are labeled with a user-defined placement order. The layout includes Row 1 440 which has two sub-rows 441, 442.

Sub-row placement may be implemented through the use of an insertion list. The sub-row placement method is described with reference to the flow diagrams 500, 550 of FIGS. 5A and 5B. A similar method may be used for sub-column placement.

Figure 5A:
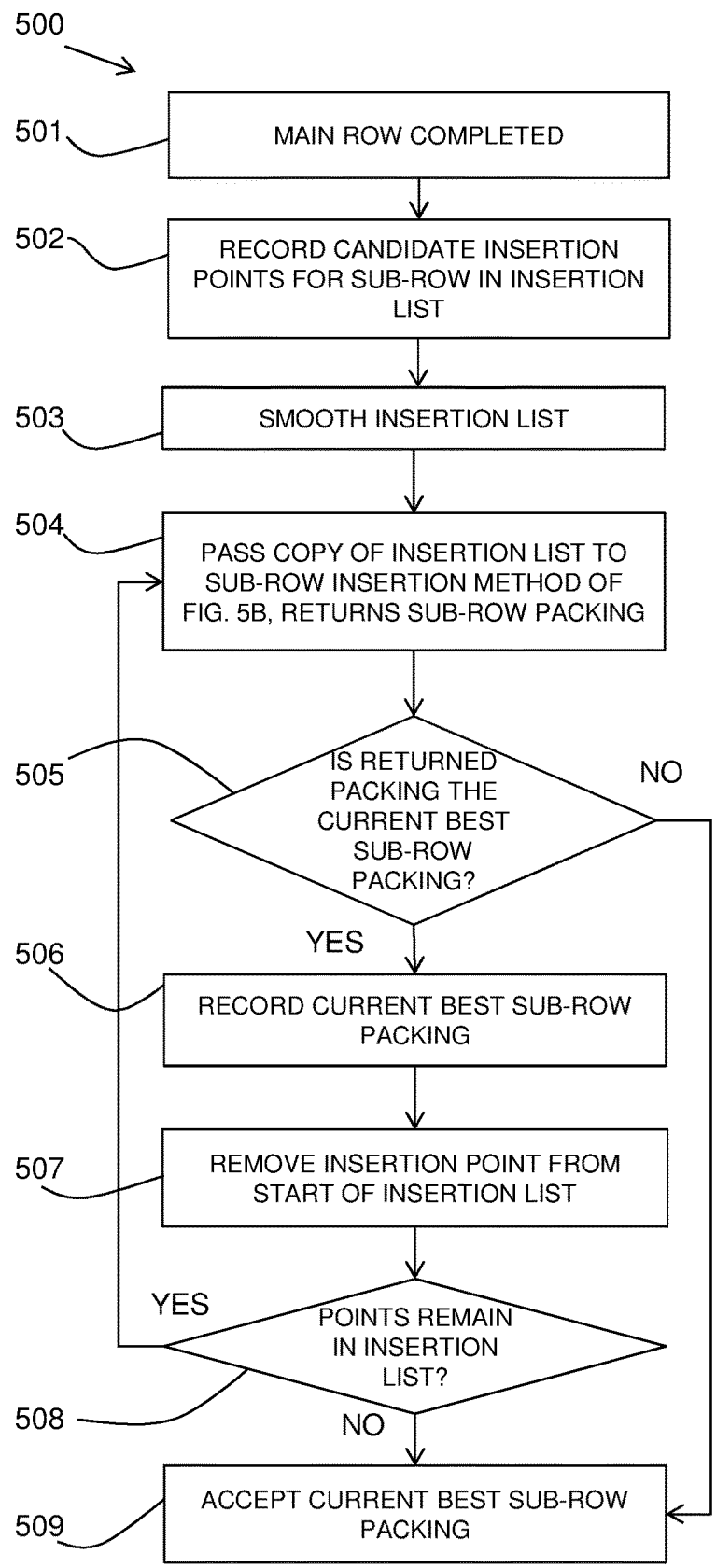
FIGS. 5A and 5B are flow diagrams of example embodiments of aspects of a method in accordance with the present invention.
Figure 5B:
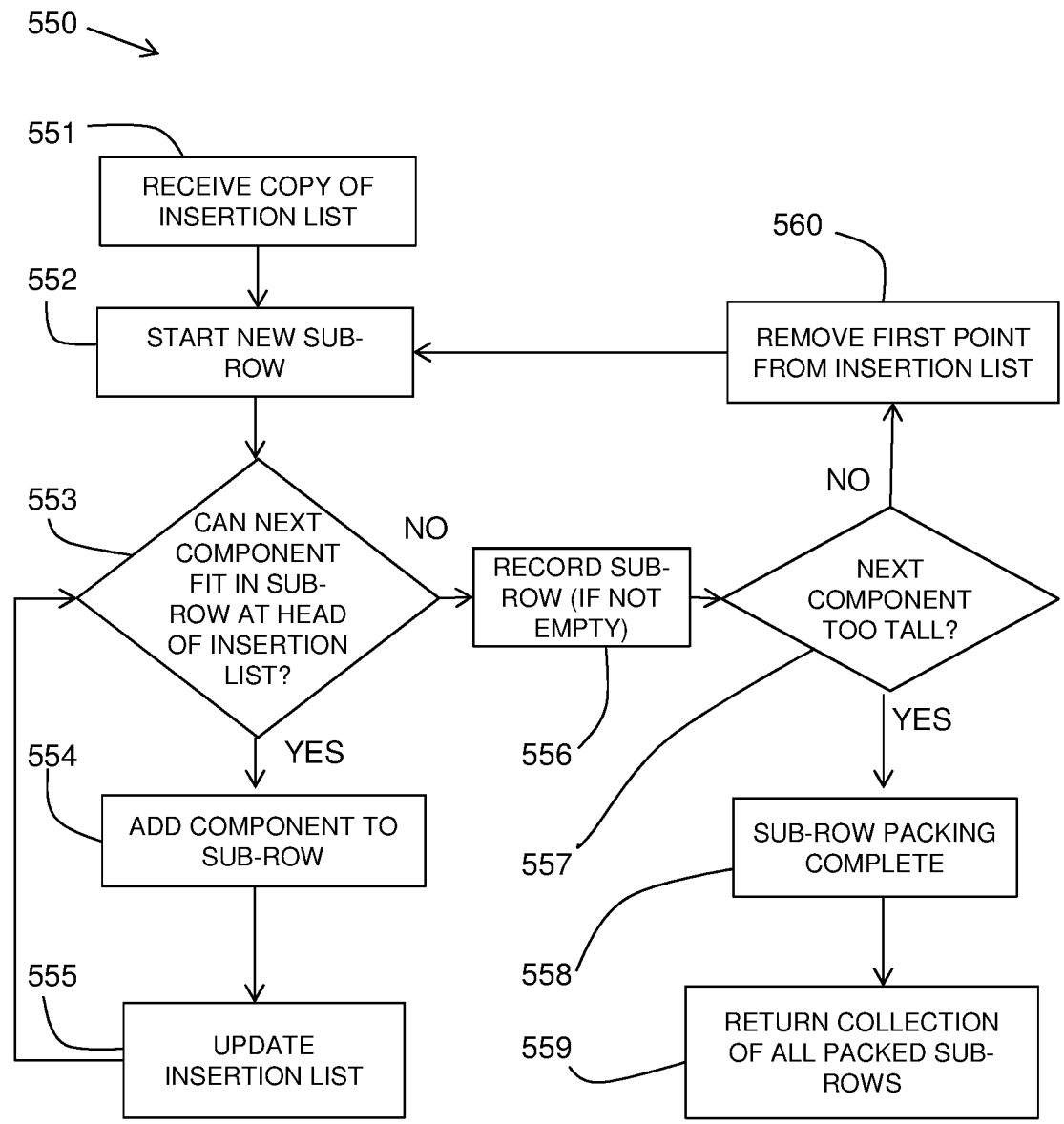

FIG. 5A illustrates a method of determining the best sub-row packing by examining each candidate insertion point in the main row insertion list. FIG. 5B illustrates a method of fitting a collection of sub-rows within a main row, starting at the head of the insertion list.

Referring to FIG. 5A, the insertion list is built once a main row has been constructed 501, and records 502 the candidate locations from which sub-rows may be started within the free space below the main row. The insertion points may be stored in a top-right to bottom-left order, with each successive point being below and to the left of its predecessor. The first point in the insertion list is defined to be the top right corner of the main row, and the last point is defined to be the bottom left corner of the main row. The valid insertion points are then the interior points of this list.

Figure 6A:
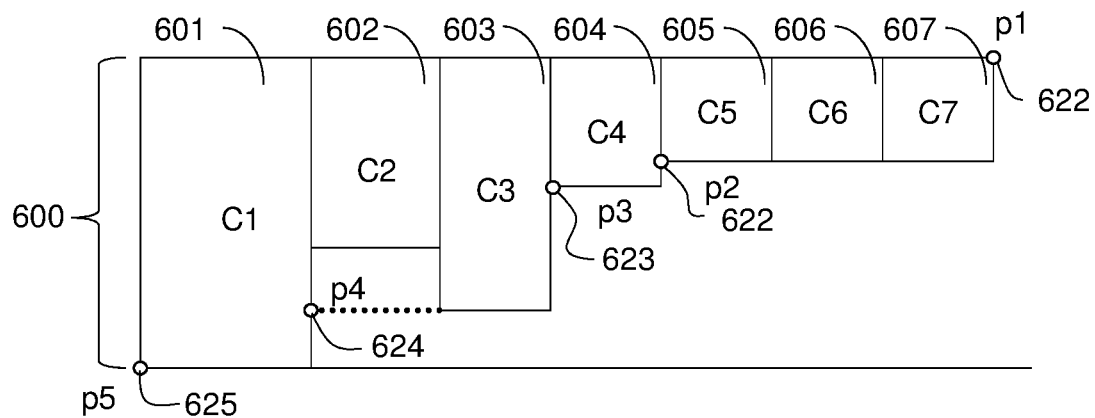
FIGS. 6A to 6C are schematic diagrams showing three stages of a component placing using a method in accordance with the present invention.

The construction process is illustrated in FIG. 6A described further below.

Figure 6B:
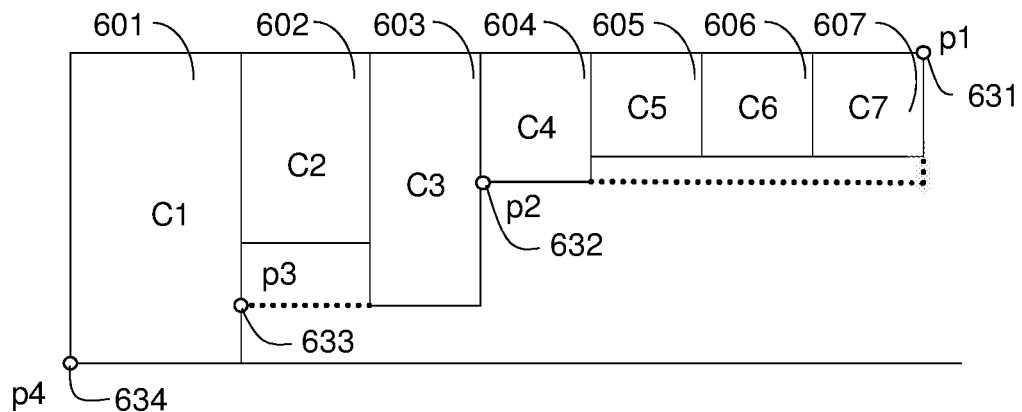

The most visually pleasing sub-row placements may be obtained when sub-rows are started as far to the left as possible, provided that this does not generate too great a separation from the row/sub-row immediately above. For this reason, the insertion list may be smoothed 503 by merging candidate insertion points that are very close together vertically. The smoothing process is illustrated in FIG. 6B, where extra sub-row width may be gained at little cost in vertical displacement by merging points.

Once the initial insertion list has been constructed 502 and smoothed 503, the algorithm may calculate a series of sub-row placements. A copy of the insertion list may be passed 504 to a sub-row insertion method shown in FIG. 5B which may return a sub-row packing.

It may be determined 505 if the returned sub-row packing is the current best sub-row packing. If it is not the current best sub-row packing, then the method may accept the current best sub-row packing 509.

If it is the current best sub-row packing, then it may be recorded 506 as the best sub-row packing and the insertion point may be removed 507 from the start of the insertion list.

It may then be determined 508 if any points remain in the insertion list. If points do remain in the insertion list then the method may loop to step 504 of passing a copy of the insertion list to the method of FIG. 5B, to return a sub-row packing.

If no points remain in the insertion list, the current best sub-row packing may be accepted 509.

It should be noted that the sub-row fitting may be performed on a copy of the initial insertion list, so that each invocation of the method of FIG. 5B may be independent of the others.

Referring to FIG. 5B, a method of fitting a collection of sub-rows within a main row is described starting at the head of the insertion list.

A copy of the insertion list is received 551 and a new sub-row may be started 552. It may be determined 553 if the next component can fit in the sub-row at the head of the insertion list. This test can fail if the component is too tall or if the component is too wide. If it can fit, the component may be added 554 to the sub-row and the insertion list may be updated 555 before looping to the next component 553.

If the next component cannot fit, the sub-row may be recorded 556 if it is not empty. It may then be determined 557 if the next component is too tall. If it is too tall, the sub-row packing may be complete 558 and the collection of all packed sub-rows may be returned 559.

If the next component is not too tall (it was too wide), the first point may be removed from the insertion list 560 and a new sub-row may be started 552.

Figure 6C:
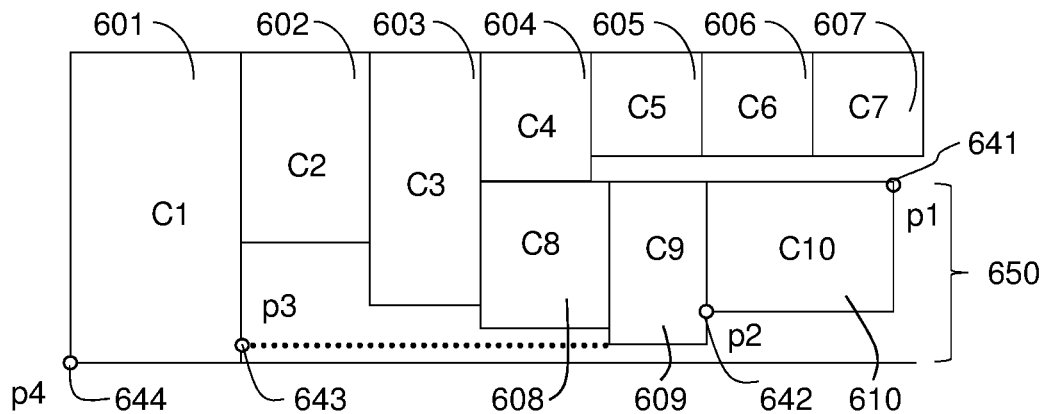

In this way a series of sub-row placements may be generated, one from each point in the initial insertion list, starting at the first insertion point (top right), and working backwards to the last (bottom left). For each completed set of sub-row placements, the number of components accommodated may be recorded. As long as this is greater than the number accommodated by the previous set of sub-row placements, the process may be continued. As soon as the number decreases, the search may be terminated, and the set of sub-row placements with the greatest number of accommodated components may be accepted. In FIG. 6B, for example, the initial (smoothed) insertion list may contain four insertion points—p1, p2, p3 and p4. A sub-row placement from p1 may fail to accommodate any components (by construction). So, attention may move to the insertion point p2 of FIG. 6B. A sub-row placement from this p2 may accommodate three components (C8, C9, C10), all in a single sub-row, as shown in FIG. 6C. This may improve on the p1-solution, and may become the current best choice. Attention then may move to the insertion point p3 of FIG. 6B (not FIG. 6C—that is a modified p3). From this p3, no components can be placed, which is certainly less than three, so the search may terminate here.

The algorithm described may place sub-rows directly within each main row. In a generalization of the method, sub-rows may themselves be placed within sub-rows in a nested manner. This can improve packing efficiency whilst still respecting the general left-to-right and top-to-bottom layout style.

Referring to FIGS. 6A to 6C, the sub-row placement method is illustrated.

FIG. 6A illustrates a first full row 600 with placed components C1-C7 601-607. There are five possible insertion points p1-p5 621-625. The sub-row insertion list is (p1, p2, p3, p4, p5) moving from top-right to bottom-left order. Component C3 603 may occlude C2 602 causing a pruning of the insertion list at point p4 624.

FIG. 6B illustrates a next step in which a smoothing may remove the previous insertion point p2 622 adjacent to components C4 604 and C5 605. The remaining insertion points may be renumbered p1-p4 631-634. Extra width may be gained at little cost in height. The updated insertion list is (p1, p2, p3, p4).

FIG. 6C illustrates a sub-row 650 formed of three components C8-C10 608-610 inserted at insertion point p2 632. An updated insertion list (p1, p2, p3, p4) of points p1-p4 641-644 may be generated following the addition of the sub-row 650.

Module-2: Optimization Module

Once all components have been placed, the height of the total layout is known for the width w which has been used and the resultant layout area may be optimized according to a required optimization. For example, the optimization may be the layout aspect ratio, the layout efficiency or adjusted efficiency, the layout area, etc. and these can be calculated.

The optimization module may seek to maximize the adjusted efficiency, or the aspect ratio efficiency, or minimize the area of the layout generated in the core layout module by suitable selection of the layout width.

The width of any layout must lie somewhere between the width of the widest component and the sum of the widths of all components. Hence there is a bounded range of widths in which to locate the optimal value, and any stable uni-variate interval optimization algorithm may be used to find an approximation to the optimal width. Suitable algorithms include bisection search, Fibonacci search, and Brent search. These search algorithms may require only a small number of calls to the fixed-width layout module (typically no more than 10), and because of the simplicity of the fixed width placement algorithm itself, the iterative width adjustment process may run very quickly.

Figure 7:
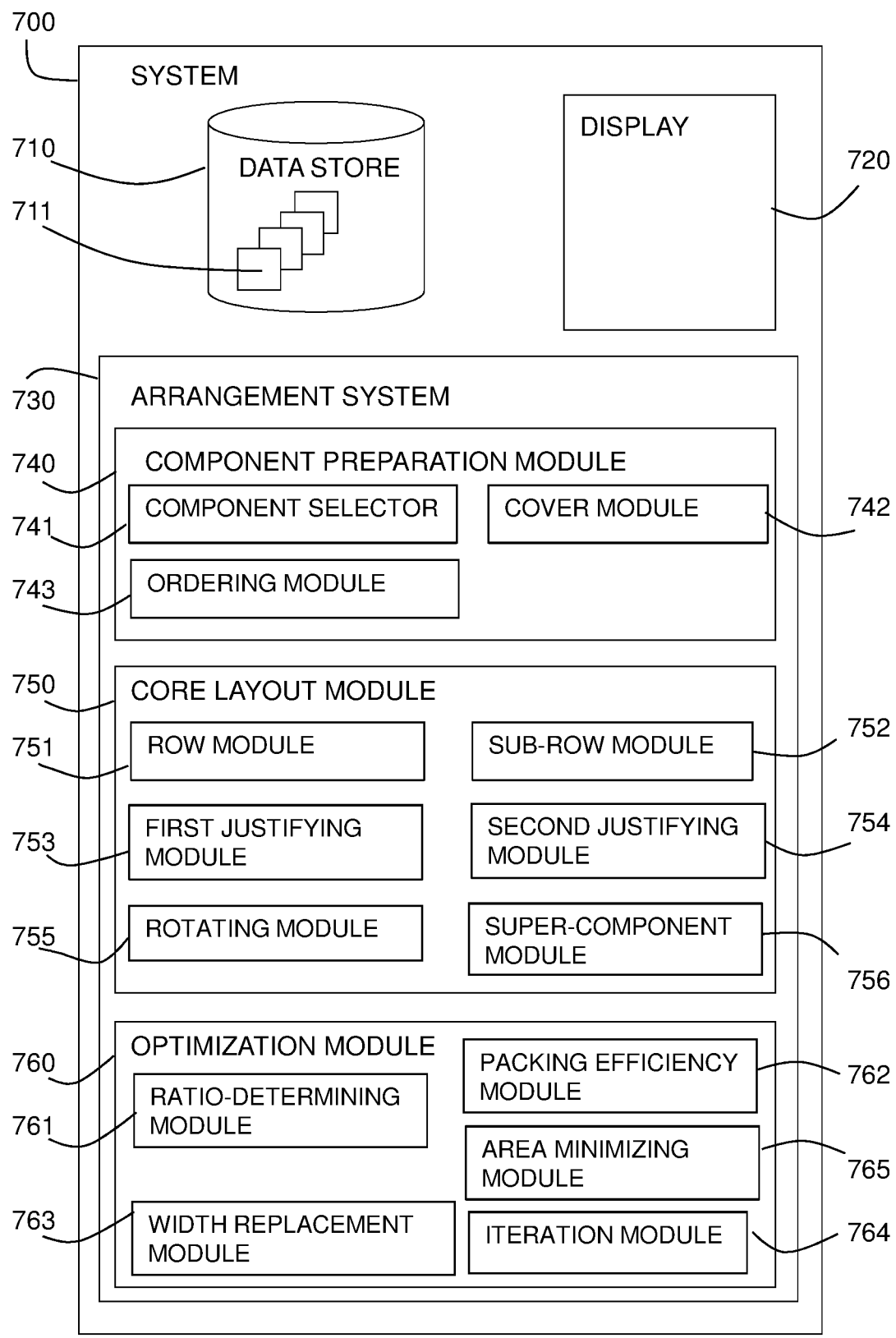
FIG. 7 is block diagram of an example embodiment of a system in accordance with the present invention.

Referring to FIG. 7, a block diagram illustrates an embodiment of the described system 700.

The system 700 may include or has access to a data store 710 for storing components 711 for representation in an arrangement, which may be shown on a display 720.

An arrangement system 730 is described for arranging components in a two-dimensional area. The arrangement system 730 may include three sub-modules a component preparation module 740, a core layout module 750, and an optimization module 760. However, functionality of these described modules may be provided in other combinations of modules.

The arrangement system 730 may be provided on any data processing system in which components are configured for arrangement. The arrangement may be displayed on a hardware display which may be provided remotely or locally to the arrangement system 730.

The component preparation module 740 may include a component selector 741 for selecting or receiving a set of components to be arranged. A cover module 742 may determine a rectangular cover for each component. An ordering module 743 may define an order preference for the arranged components by analyzing the relevant parameters of each component.

The components of the arrangement system 730 are described in terminology relating to a row and sub-row arrangement of components. However, corresponding components may be provided for column and sub-column arrangements of components.

The core layout module 750 may arrange components in a first stage of the arrangement in a fixed width vertical strip. The core layout module 750 may include a row module 751 for positioning component in a full row and a sub-row module 752 for positioning components in a sub-row. The sub-row module 752 may include functionality to determine the placement of sub-rows in space under or above a full row using insertion points as described in relation to FIG. 5.

The core layout module 750 may also include a first justifying module 753 for horizontal justification of components within a row or a sub-row and a second justifying module 754 for vertical justification of a sub-row vertically.

The core layout module 750 may also include a rotating module 755 for rotating components to align with the axes of the arrangement.

The core layout module 750 may also include a super-component module 756 for arranging non-singleton components.

The optimization module 760 may arrange components in a second stage of the arrangement to optimize a factor of the arrangement. For example, optimizing the aspect ratio, the packing efficiency of the arrangement, or minimizing the resultant area of the arrangement.

The optimization module 760 may include an arrangement quality optimization module for optimizing a desired arrangement quality. The arrangement quality optimization module may be a ratio determining module 761 for determining an aspect ratio of an arrangement during iterations. The arrangement quality optimization module may additionally or alternatively include a packing efficiency module 762 for determining a packing efficiency of an arrangement during iterations. The arrangement quality optimization module may further additionally or alternatively include an area minimizing module 765 for determining a minimum area during iterations.

The optimization module 760 may include a width replacement module 763 for changing the width of the strip into which the components are arranged and an iteration module 764 for iterating the width change until a required aspect ratio or packing efficiency may be reached.

Figure 8:
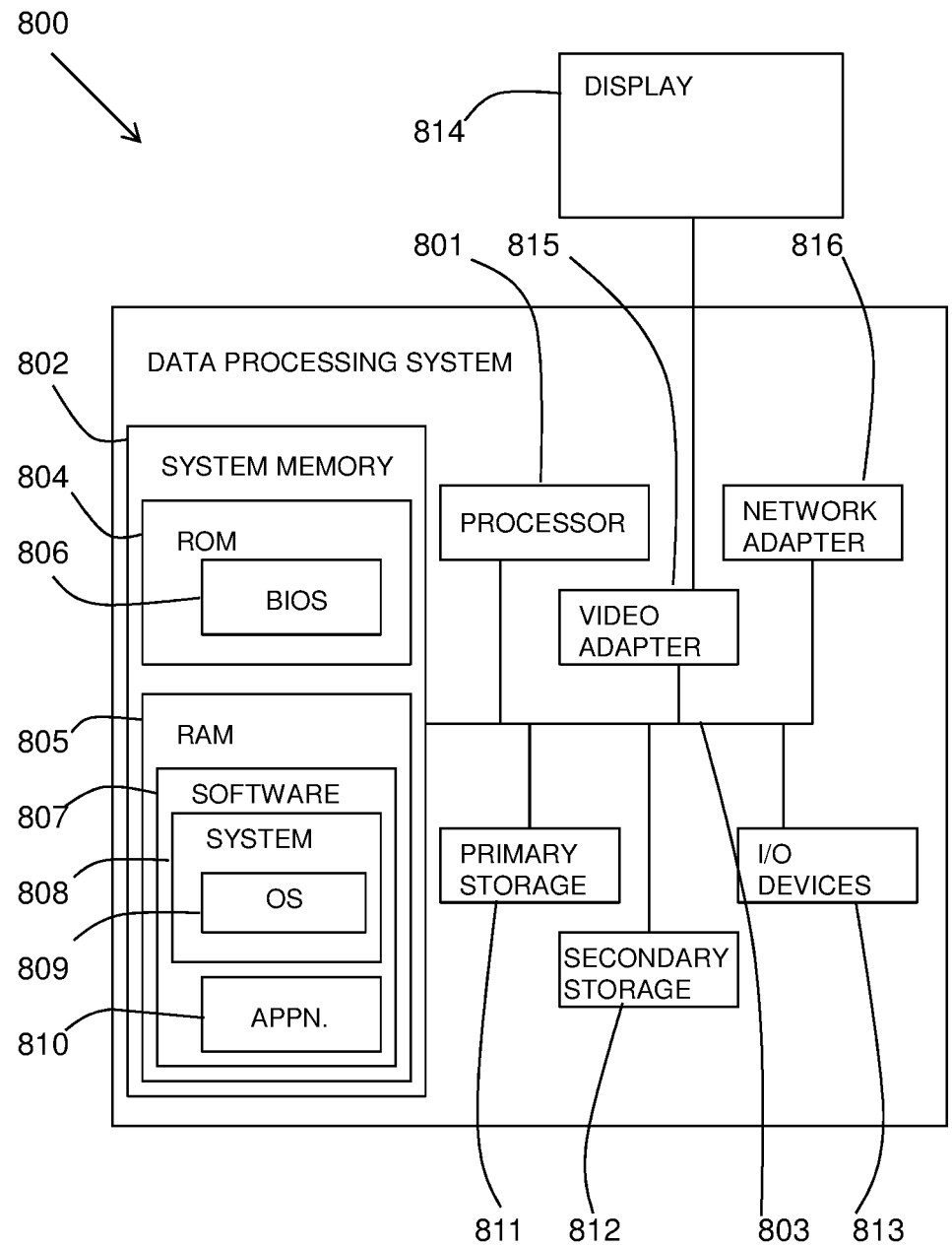
FIG. 8 is a block diagram of an embodiment of a computer system in which the present invention may be implemented.

Referring to FIG. 8, an exemplary system for implementing aspects of the invention includes a data processing system 800 suitable for storing and/or executing program code including at least one processor 801 coupled directly or indirectly to memory elements through a bus system 803. The memory elements may include local memory employed during actual execution of the program code, bulk storage, and cache memories which provide temporary storage of at least some program code in order to reduce the number of times code must be retrieved from bulk storage during execution.

The memory elements may include system memory 802 in the form of read only memory (ROM) 804 and random access memory (RAM) 805. A basic input/output system (BIOS) 806 may be stored in ROM 804. System software 807 may be stored in RAM 805 including operating system software 808. Software applications 810 may also be stored in RAM 805.

The system 800 may also include a primary storage means 811 such as a magnetic hard disk drive and secondary storage means 812 such as a magnetic disc drive and an optical disc drive. The drives and their associated computer-readable media provide non-volatile storage of computer-executable instructions, data structures, program modules and other data for the system 800. Software applications may be stored on the primary and secondary storage means 811, 812 as well as the system memory 802.

The computing system 800 may operate in a networked environment using logical connections to one or more remote computers via a network adapter 816.

Input/output devices 813 may be coupled to the system either directly or through intervening I/O controllers. A user may enter commands and information into the system 800 through input devices such as a keyboard, pointing device, or other input devices (for example, microphone, joy stick, game pad, satellite dish, scanner, or the like). Output devices may include speakers, printers, etc. A display device 814 is also connected to system bus 803 via an interface, such as video adapter 815.

Figure 9A:
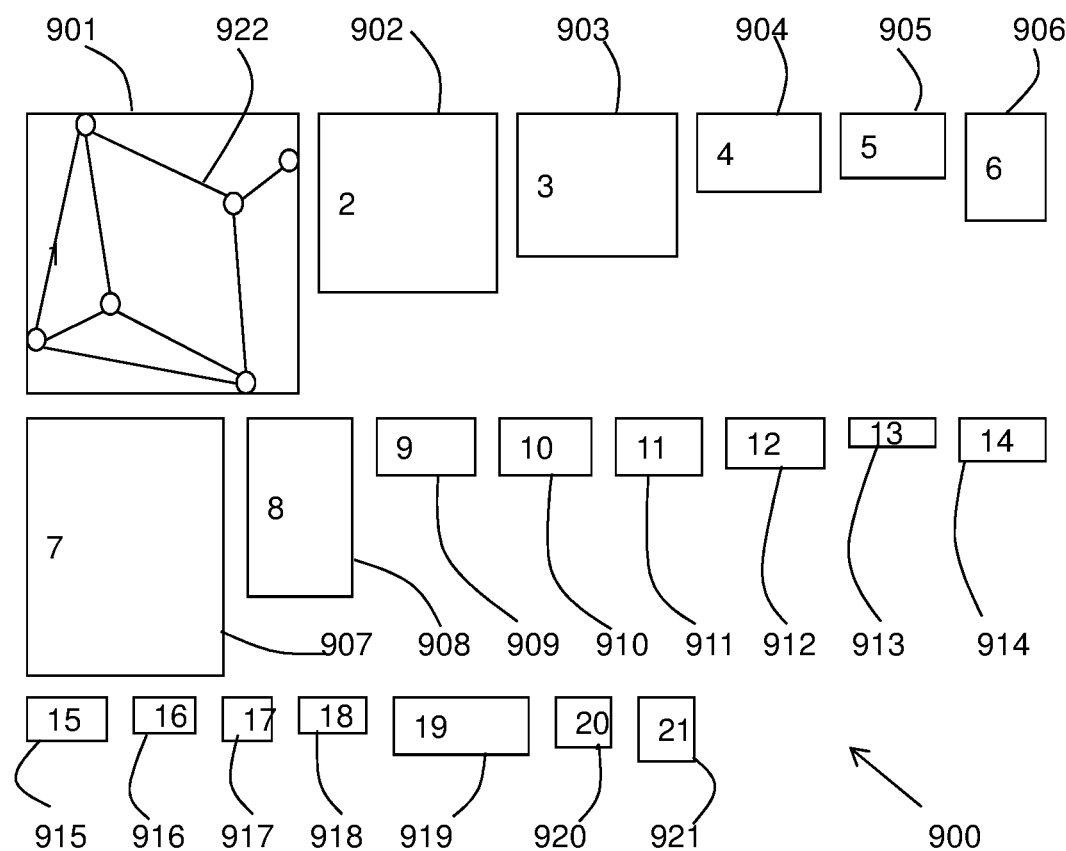
FIG. 9A is a schematic diagram showing an example layout of a first example set of components using a method of the prior art.
Figure 9B:
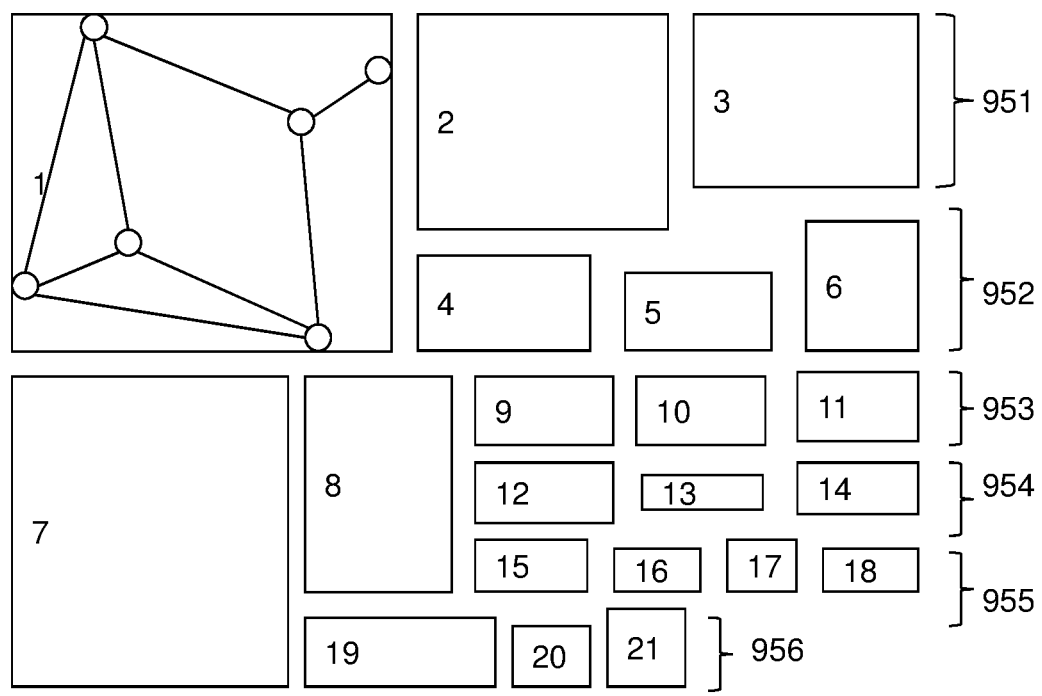
FIG. 9B is a schematic diagram showing an example layout of the first example set of components using a method in accordance with the present invention.

Referring to FIGS. 9A and 9B, a first example set of components is shown for arrangement in a display. The component each have rectangular covers 901-921. The first component's rectangular cover 901 shows the shape of the component 922 in the form of a collection of vertices interconnected by edges.

In the displays 900, 950 of FIGS. 9A and 9B, the components may be ordered.

In the display 900 of FIG. 9A, a method is used for displaying the ordered components without sub-row packing. The components may be displayed in full rows.

In the display 950 of FIG. 9B, the described method for displaying the ordered components may be used including sub-row packing. The resultant display 950 may include a first full row 951 having one sub-row 952, a second full row 953 having three sub-rows 954, 955, 956.

Figure 10:
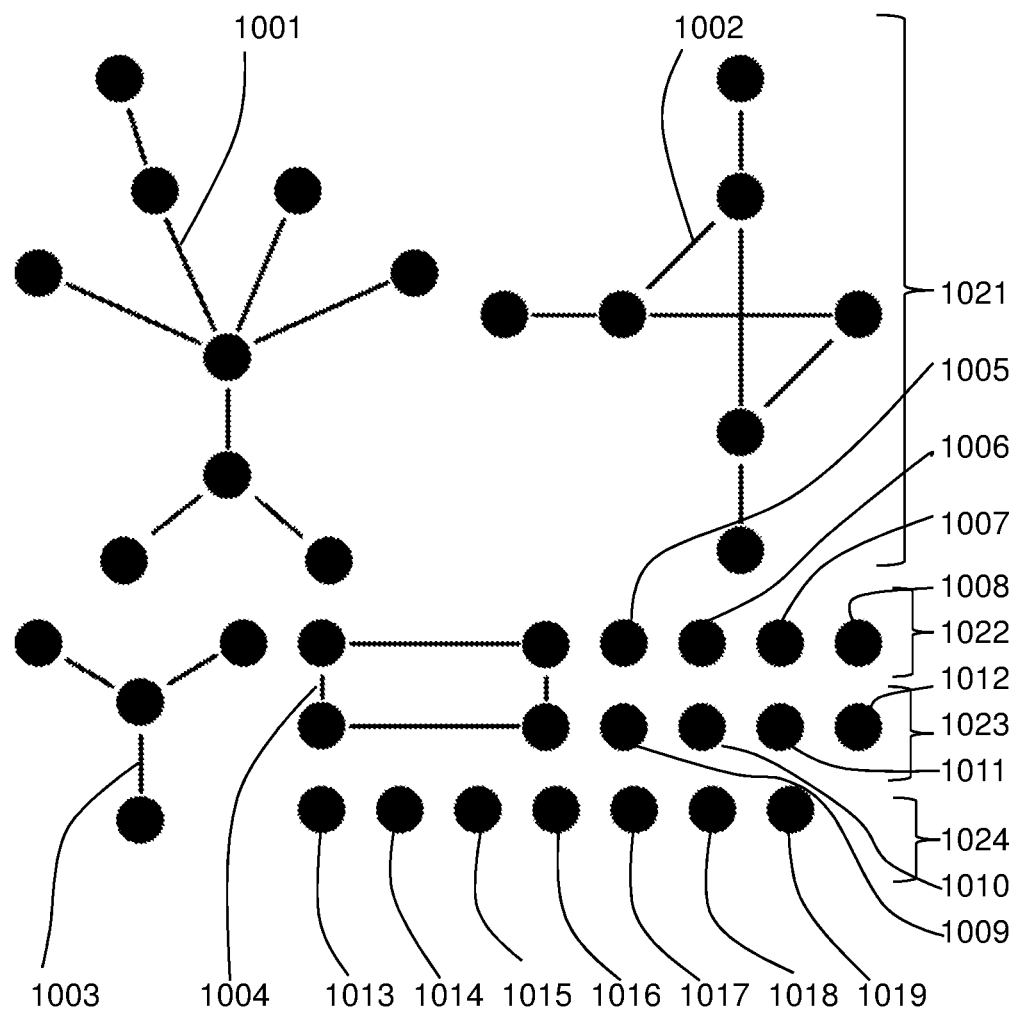
FIG. 10 is a schematic diagram showing an example layout of a second example set of components using a method in accordance with the present invention.

Referring to FIG. 10, a second example set of components is shown in which the components 1001-1019 are shown without their rectangular covers. The components may be in the form of some multi-vertex components 1001-1004 and some singleton components 1005-1019. The components 1001-1019 may be ordered with the multi-vertex components 1001-1004 first in order of size.

The resultant display 1000 may include a first full row 1021 formed of the two largest multi-vertex components 1001, 1002, followed by a second full row 1022 formed of two multi-vertex components 1003, 1004 and the first four of the singleton components 1005-1008.

The second full row 1022 may have two sub-rows 1023, 1024 of further singleton components 1009-1019.

Figure 11:
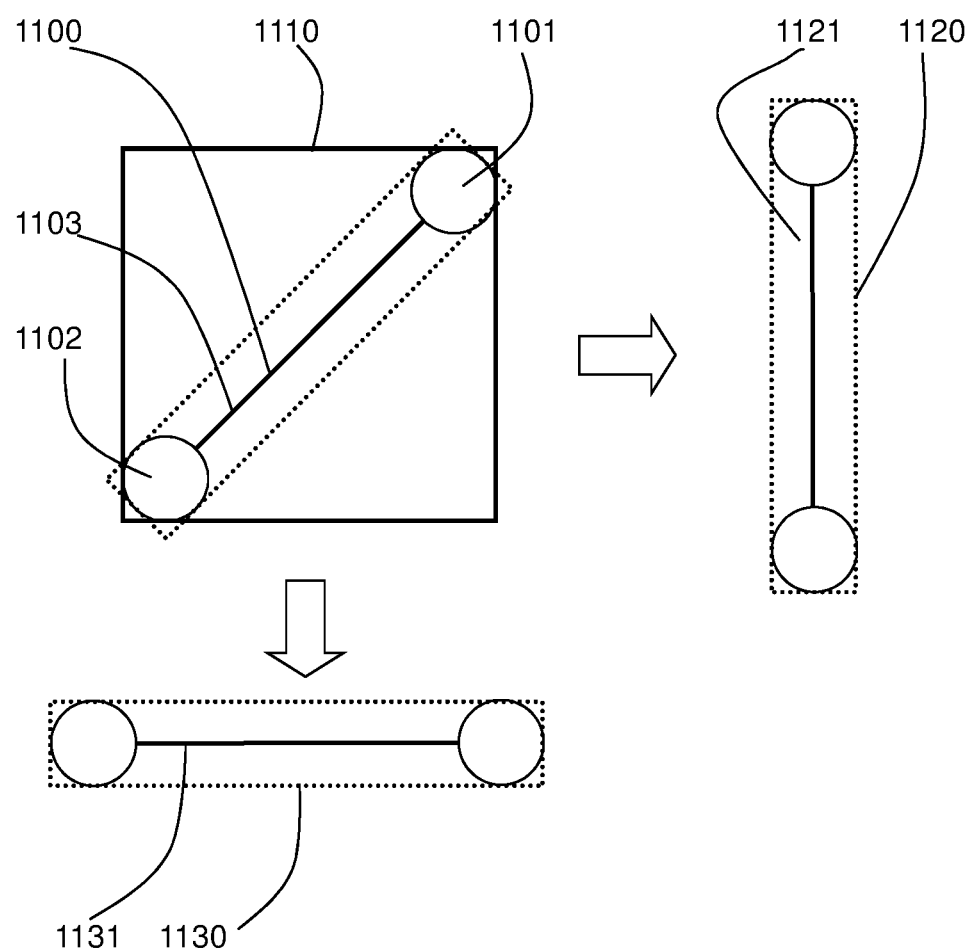
FIG. 11 is a schematic diagram showing an aspect of a method in accordance with the present invention.

Referring to FIG. 11, the aspect of automatic rotation of components is illustrated. Rotation may be carried out so that a component aligns cleanly with the coordinate axes. This may improve the packing efficiency without changing the component layout itself (beyond rotation). The rotation may be calculated by determining an approximate minimum area bounding box enclosing the component.

In FIG. 11, a component 1100 comprises two vertices 1101, 1102 and an edge 1103. In its initial orientation, the component 1100 is diagonal to the coordinate axes of the display and therefore its bounding rectangle 1110 is of a square form. If the component 1100 is rotated to a vertical alignment 1121, its bounding rectangle 1120 will be a minimum size, in this case tall and narrow. If the component 1100 is rotated to a horizontal alignment 1131, its bounding rectangle 1130 may also be reduced to a minimum size, in this case it will be short and long.

The generated arrangement of components may have the technical advantage of optimizing aspects of the arrangement of components, such as the efficiency of the arrangement packing, meeting a required aspect ratio within a required area, or minimizing the resultant area, or whilst arranging the components in an ordered manner.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of the present invention.

What is claimed is:

1. A method for arranging components in a two-dimensional area, comprising:
receiving a set of components for arrangement in the two-dimensional area, the set of components being in a rectangular form, each component in the set of components comprising at least one of a disconnected graph component and a rectangular representation of an entity;
based on the set of components being in a form different than a rectangular form, determining rectangular covers for each component, wherein the rectangular covers comprise an object to represent each component within a set of rectangular borders using a minimum area of a rectangle to cover the component;
based on a predefined order preference set by a user, ordering the set of components according to the predefined order preference by analyzing relevant parameters associated with each component;
selecting a first width from a bounded range of widths comprising width values varying between a width of a widest component in the set of components and a sum of all component's widths;
calculating an optimal width value by applying an stable univariate interval optimization algorithm to the bounded range of widths, the stable univariate interval optimization algorithm comprising at least one of a bisection search, a Fibonacci search, and a Brent search;
based on the predefined order preference, mapping the set of components into an infinite vertical strip of fixed width, the fixed width of the infinite vertical strip is equal to the first width, wherein mapping the set of components comprises:
defining a first direction across the first width, wherein the first direction comprises a left-to-right direction;
orderly positioning the set of components in a first row across the first direction aligning one of the top or bottom sides of the rectangular covers of an adjacent component until a next component does not fit in the first width;
before starting a next row, determining whether additional space is available within a height of the first row;
based on additional space being available, positioning the next component in the available space within the height of the first row to form one or more sub-rows in the first direction extending a distance that is less than the first width;
positioning the set of components in a next row and one or more sub-rows, until each component in the set of components has been positioned,
wherein sub-rows and rows are below a previous row when top sides of the rectangular covers are aligned,
wherein sub-rows and rows are above the previous row when bottom sides of the rectangular covers are aligned;
based on all components in the set of components being positioned, determining a height of a total layout of the arrangement of the set of components according to the first width and optimizing a resultant layout area according to a user-defined measure of arrangement quality comprising at least one of an aspect ratio of the resultant layout area, a packing efficiency of the resultant layout area, and a size of the resultant layout area;
automatically rotating the set of components to align them with coordinate axes of the arrangement without changing the resultant component layout, wherein the rotation is calculated by determining an approximate minimum area bounding box enclosing the set of components; and
nesting at least one sub-row within another sub-row to increase a packing efficiency of the resultant component layout while keeping a left-to-right and top-to-bottom layout.

2. The method according to claim 1, further comprising: justifying components horizontally within a row and within a sub-row.

3. The method according to claim 1, further comprising: justifying components vertically within a sub-row.

4. The method according to claim 1, wherein the first direction comprises a right-to-left direction.

5. The method according to claim 1, further comprising:
determining the measure of arrangement quality for the first width and the resultant height;
replacing the first width with a new width;
mapping the set of components according to the new width; and
replacing the width with a new width until the optimization of the arrangement quality is obtained.

6. The method according to claim 1, further comprising:
applying the method to a non-singleton component to display the non-singleton component in a rectangular region and create a super-component; and
applying the method to the super-component and an excluded singleton component to create a final arrangement.

7. The method according to claim 1, wherein the predefined order preference is selected from the group consisting of a decreasing order of vertex count, a decreasing order of component height, a decreasing order of the greater of component height or component width, a decreasing order of any user-defined measure of component interest or importance, an alphabetical order by vertex label, and an order by vertex type and label.

8. The method according to claim 1, wherein positioning the next component in the available space further comprises:
determining candidate insertion points within a row or sub-row;
based on the determined candidate insertion points, constructing an insertion list;
smoothing the insertion list by merging the candidate insertion points that are substantially close in a vertical direction;
placing the next component in a sub-row at a first insertion point in which the component's height fits in the first direction;
updating the insertion list; and
placing the next component in a sub-row at a first insertion point in which the component's height fits in the first direction.

9. A computer program product for arranging components in a two-dimensional area, comprising:
a non-transitory computer readable storage medium containing computer instructions stored therein for causing a computer processor to perform the steps of:
receiving a set of components for arrangement in the two-dimensional area, the set of components being in a rectangular form, each component in the set of components comprising at least one of a disconnected graph component and a rectangular representation of an entity;
based on the set of components being in a form different than a rectangular form, determining rectangular covers for each component, wherein the rectangular covers comprise an object to represent each component within a set of rectangular borders using a minimum area of a rectangle to cover the component;
based on a predefined order preference set by a user, ordering the set of components according to the predefined order preference by analyzing relevant parameters associated with each component;
selecting a first width from a bounded range of widths comprising width values varying between a width of a widest component in the set of components and a sum of all component's widths;
calculating an optimal width value by applying an stable univariate interval optimization algorithm to the bounded range of widths, the stable univariate interval optimization algorithm comprising at least one of a bisection search, a Fibonacci search, and a Brent search;
based on the predefined order preference, mapping the set of components into an infinite vertical strip of fixed width, the fixed width of the infinite vertical strip is equal to the first width, wherein mapping the set of components comprises:
defining a first direction across the first width, wherein the first direction comprises a left-to-right direction;
orderly positioning the set of components in a first row across the first direction aligning one of the top or bottom sides of the rectangular covers of an adjacent component until a next component does not fit in the first width;
before starting a next row, determining whether additional space is available within a height of the first row;
based on additional space being available, positioning the next component in the available space within the height of the first row to form one or more sub-rows in the first direction extending a distance that is less than the first width;
positioning the set of components in a next row and one or more sub-rows, until each component in the set of components has been positioned,
wherein sub-rows and rows are below a previous row when top sides of the rectangular covers are aligned,
wherein sub-rows and rows are above the previous row when bottom sides of the rectangular covers are aligned;
based on all components in the set of components being positioned, determining a height of a total layout of the arrangement of the set of components according to the first width and optimizing a resultant layout area according to a user-defined measure of arrangement quality comprising at least one of an aspect ratio of the resultant layout area, a packing efficiency of the resultant layout area, and a size of the resultant layout area;
automatically rotating the set of components to align them with coordinate axes of the arrangement without changing the resultant component layout, wherein the rotation is calculated by determining an approximate minimum area bounding box enclosing the set of components; and
nesting at least one sub-row within another sub-row to increase a packing efficiency of the resultant component layout while keeping a left-to-right and top-to-bottom layout.

10. The computer program product according to claim 9, further comprising:
justifying components horizontally within a row and within a sub-row.

11. The computer program product according to claim 9, further comprising:
justifying components vertically within a sub-row.

12. The computer program product according to claim 9, wherein the first direction comprises a right-to-left direction.

13. The computer program product according to claim 9, further comprising:
determining the measure of arrangement quality for the first width and the resultant height;
replacing the first width with a new width;
mapping the set of components according to the new width; and
replacing the width with a new width until the optimization of the arrangement quality is obtained.

14. The computer program product according to claim 9, further comprising:
applying the method to a non-singleton component to display the non-singleton component in a rectangular region and create a super-component; and applying the method to the super-component and an excluded singleton component to create a final arrangement.

15. The computer program product according to claim 9, wherein the predefined order preference is selected from the group consisting of a decreasing order of vertex count, a decreasing order of component height, a decreasing order of the greater of component height or component width, a decreasing order of any user-defined measure of component interest or importance, an alphabetical order by vertex label, and an order by vertex type and label.

16. The computer program product according to claim 9, wherein positioning the next component in the available space further comprises:
- determining candidate insertion points within a row or sub-row;
- based on the determined candidate insertion points, constructing an insertion list;
- smoothing the insertion list by merging the candidate insertion points that are substantially close in a vertical direction;
- placing the next component in a sub-row at a first insertion point in which the component's height fits in the first direction;
- updating the insertion list; and
- placing the next component in a sub-row at a first insertion point in which the component's height fits in the first direction.

* * * * *